Feb. 22, 1927.
E. F. DICKIESON, JR
1,618,520
PISTON RING
Filed June 13, 1922
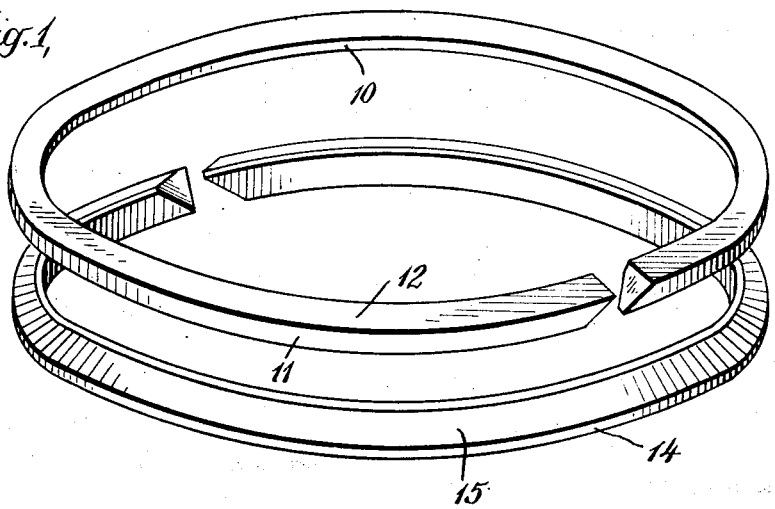
Fig.1,
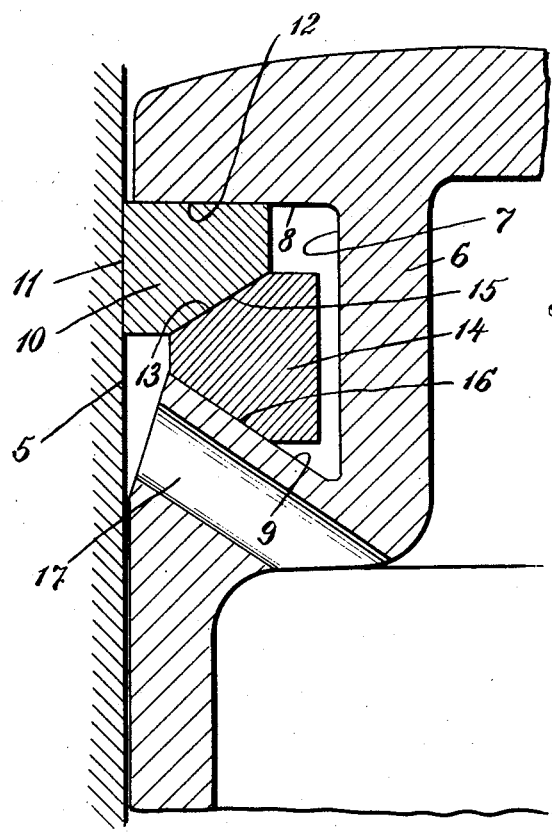
Fig.2,
INVENTOR
Edward F. Dickieson Jr.
BY
Pennie Davis Marvin & Edmonds
his ATTORNEYS Patented Feb. 22, 1927.

1,618,520

UNITED STATES PATENT OFFICE.

EDWARD F. DICKIESON, JR., OF BROOKLYN, NEW YORK.

PISTON RING.

Application filed June 13, 1922. Serial No. 567,946.

This invention relates to pistons and piston rings cooperating therewith to seal the expansion chamber of an engine, the invention being particularly adapted though not necessarily limited to use in internal combustion engines.

Since the introduction and rapid development of internal combustion, and particularly automotive engines, many attempts have been made to provide a satisfactory cylinder packing. From the earliest ring consisting simply of a split concentric band, the art has advanced to the eccentric or uniform pressure type and has included two and three-part rings of differing construction and more or less satisfactory performance. Generally the rings have been designed to operate in parallel-walled grooves in the piston and have been subject to breakage when slightly worn because of lateral movement which permitted jamming in the grooves.

In attempting to overcome the undesirable features of piston rings as heretofore known, it is necessary to consider the conditions under which the ring operates. The piston attains a temperature of about 600° F. higher than the cylinder wall while the rings operate at an intermediate temperature so that the expansion of the several parts is unequal. This condition is aggravated with aluminum pistons which are coming into general use because of certain advantages which they present. Furthermore, the bore of the cylinder is never exactly true. To compensate for the variations due to different temperatures and coefficients of expansion and inaccuracies in machining, it is necesary to employ rings, and if the expansion chamber is to be successfully sealed, the rings must be capable of radial expansion and contraction. To prevent jamming and breaking the rings must be supported by the walls of the groove as they expand and contract, and the support must be effective even after considerable wear has occurred.

It is the object of this invention to provide a piston ring which avoids the difficulties heretofore experienced and which ensures a tight combustion chamber under all conditions of piston speed and temperature even after the rings have become worn because of unavoidable friction which, however, is reduced to a minimum by the construction hereinafter described.

Further objects and advantages of the invention will be apparent as it is better understood by reference to the following specification and accompanying drawing, in which—

Fig. 1 is a view in perspective of a piston ring embodying the invention; and

Fig. 2 is an enlarged cross-sectional view of a portion of a cylinder wall, piston and cooperating ring.

My invention depends upon the use of split packing and wedging rings, both preferably of the uniform pressure type and cooperating with the walls of a groove of special form to properly balance and distribute the forces acting upon the piston ring. The packing ring is the sealing element and the wedging ring holds it in close engagement with the cylinder wall and with the wall of the groove. The wedging ring engages the opposite wall of the groove, and owing to its form and the angle at which the latter wall is disposed, the wedging ring gives readily to permit contraction of the packing ring. It nevertheless holds the face of the packing ring in proper alignment with the cylinder wall at all times and prevents jamming which is the most frequent source of breakage in piston rings. The preferred angular relation of the bearing surfaces on the groove wall, wedging and packing rings will vary with the particular conditions of cylinder pressure and piston speed under which the ring is required to operate. In general an included angle of from 50 to 65° between the bearing face of the packing ring and the wall of the groove is most satisfactory. The wedge will, of course, have a corresponding angularity so that it will closely fill the space between the packing ring and the wall of the groove and follow the packing ring as the latter expands or contracts.

Referring to the drawing, 5 indicates the cylinder wall and 6 the piston which may be of any of the usual types, differing therefrom only in the provision of a groove or grooves 7 having one lateral wall 8 in a plane perpendicular to the axis of the cylinder, and the other lateral wall 9 angularly disposed with respect to that plane. In other words, the groove is wider at the bottom than at the top and may be designated as an undercut groove for convenience of expression. A packing ring 10 is provided with a cylindrical face 11 for engagement with the cylinder wall and a plane face 12 which is tightly pressed against the wall 8 of the groove to prevent the entrance of gas into the groove. Another face 13 of the packing ring bears an angular relation to the plane of the wall 8. A wedging ring 14 of wedge-shaped cross-section, having opposite angularly-disposed faces 15 and 16, is disposed between the face 13 of the packing ring and the wall 9 of the groove. The included angle between the faces 15 and 16 is preferably about 53°, although this angle may vary under differing conditions and reference thereto is merely illustrative. A space is provided below the packing ring for the collection of oil, and one or more ducts 17 are preferably provided to drain this oil into the interior of the piston. These ducts are not, however, essential to the invention.

As will be readily understood, when the rings are compressed in the groove they tend to expand and thus the wedging ring holds the packing ring in close engagement with both the cylinder wall and the perpendicular wall of the groove, the pressure exerted by the wedging ring being divided into two components and acting on both of the walls mentioned. If the packing ring is caused to contract by any irregularity in the cylinder wall, the wedging ring also contracts but holds the packing ring nevertheless in true alignment, thus preventing jamming and leakage of gas. As the packing ring wears, the wedging ring automatically takes up the wear and maintains the relations described until the packing ring has been worn to such a point that it will not expand further.

Among the advantages of my invention which distinguish it from piston rings heretofore in use are the effective sealing of the combustion chamber both at the cylinder wall and groove contact surfaces, the wedging action of the wedging ring which ensures this condition when the packing ring is expanded or contracted and the freedom from vibration and consequent possibility of jamming and breaking the ring. These and other advantages are of particular importance in connection with aluminum pistons requiring a wide clearance, but the invention is likewise applicable to other pistons.

Various changes may be made in the details of construction and arrangement of the parts without departing from the invention or sacrificing any of the advantages thereof.

I claim:—

1. In a cylinder packing the combination of a piston having an inwardly diverging groove, the upper wall of which overhangs the lower wall, said lower wall being angularly disposed with reference to a plane perpendicular to the axis of the piston, and a two part expanding ring, one of the parts being wholly within the groove and having a face cooperating with said angularly disposed wall and another face angularly disposed with reference to said perpendicular plane and cooperating with the other part of the ring to expand it outwardly.

2. A piston having a circumferentially extending packing groove, the upper side of said groove being perpendicular to the axis of the piston, the lower side being beveled downwardly and inwardly and the outer edge of said lower side extending downwardly and outwardly.

3. In a cylinder packing, the combination of a piston having a circumferentially extending packing groove, the upper side of said groove being perpendicular to the axis of the piston, and its lower side being beveled downwardly and inwardly, and the outer edge of the lower side of said groove extending downwardly and outwardly, and a two part piston ring in said groove comprising a packing part having a cylindrical surface, a surface perpendicular thereto, and a surface obliquely disposed with relation to the cylindrical surface, and a wedging part having two surfaces at an acute angle, one of which cooperates with the obliquely disposed surface of the packing part, and the other of which cooperates with the beveled lower wall of the groove.

In testimony whereof I affix my signature.

EDWARD F. DICKIESON, Jr.